(12) United States Patent
Wang et al.

(10) Patent No.: US 8,515,355 B2
(45) Date of Patent: Aug. 20, 2013

(54) METHOD OF REALIZING SMART ANTENNA BASED ON SOFTWARE RADIO AND SYSTEM THEREFOR

(75) Inventors: Yanwen Wang, Shenzhen (CN); Li Zhang, Shenzhen (CN); Qiang Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 1036 days.

(21) Appl. No.: 11/913,934

(22) PCT Filed: Dec. 29, 2005

(86) PCT No.: PCT/CN2005/002375
§ 371 (c)(1), (2), (4) Date: Jun. 25, 2008

(87) PCT Pub. No.: WO2006/131036
PCT Pub. Date: Dec. 14, 2006

(65) Prior Publication Data
US 2009/0161645 A1    Jun. 25, 2009

(30) Foreign Application Priority Data
Jun. 8, 2005  (CN) .......................... 2005 1 0011887

(51) Int. Cl.
*H04B 1/00*    (2006.01)

(52) U.S. Cl.
USPC ......... 455/63.4; 455/25; 455/562.1; 455/269; 342/378; 375/130; 375/233

(58) Field of Classification Search
None
See application file for complete search history.

(56) References Cited

U.S. PATENT DOCUMENTS

| | | | | |
|---|---|---|---|---|
| 6,553,012 | B1* | 4/2003 | Katz | 370/328 |
| 6,763,062 | B1* | 7/2004 | Kohno et al. | 375/220 |
| 7,263,083 | B2* | 8/2007 | Kisigami et al. | 370/335 |

FOREIGN PATENT DOCUMENTS

| | | |
|---|---|---|
| CN | 1538625 | 10/2004 |
| CN | 1549473 | 11/2004 |

* cited by examiner

*Primary Examiner* — Zhiyu Lu
(74) *Attorney, Agent, or Firm* — IPSG, P.C. Intellectual Property Law

(57) ABSTRACT

A method of realizing smart antenna based on software radio and system therefore in IMT-2000 CDMA system. Channel conditions are classified according to the features of wireless communication channel conditions, covariance matrix of array receiving signals is step-by-step dimension-reduced and decorrelated using special smoothing differential processing method, obtaining the structure related to the receiving signals by gradually converting correlated signal into independent signal sources and realizing conditions recognition, and respectively calculating receiving weights and transmitting weights using corresponding receiving adaptive beam forming algorithm and transmitting adaptive beam forming algorithm selected according to the result of channel condition classifying. By using adaptive beam forming method of smart antenna based on software radio, the present invention has the following advantages comparing with existing adaptive beam forming method: good adaptability, avoidance of the limitation of single adaptive beam forming method, easiness of upgrading and maintaining based station system, and effective suppression of disturbing effect.

5 Claims, 6 Drawing Sheets

METHOD OF REALIZING SMART ANTENNA BASED ON SOFTWARE RADIO AND SYSTEM THEREFOR

FIELD OF THE INVENTION

The present invention relates to IMT-2000 Code Division Multiple Access (CDMA) system smart antenna technique of communication field, and particularly to a method of realizing smart antenna based on software radio and system therefore.

BACKGROUND OF THE INVENTION

In IMT-2000 (International Mobile Telecommunication-2000) CDMA communication system, the infection on digital signals by the wireless channel mainly appears as two aspects: one is the noise and interference of the channel; the other is the multipath effect of the channel. The noise is encountered is any communication systems, but as the characteristic of the mobile communication condition, the interference infection is larger than the noise infection while cofrequency interference is the main factor which limits the system performance. There are far and near effect and a plurality of access case especially in the IMT-2000 CDMA system. There may be a plurality of interference user even in a same district. Further, as the complexity of the wireless condition, a signal transmitted by the wireless channel often arrives at the receiving end along many different paths. As there will be different delay when the signal passes different paths, if the delay difference is larger, span interference could be produced.

Generally, the design of the receiver considers to suppress the interference. As for in the ideal Gaussian White Noise condition, the match filter de-expander could be used. In case that there is multipath interference, the Rake multipath diversity de-expand receiver is often used, which needs to estimate for the multipath delay and extent. In case that there is narrowband interference, the common method is to add an adaptive prediction filter before the match filter to estimate narrowband and realize separate with the wideband frequency spreading. In the IMT-2000 CDMA system where there is a plurality of access interference, a plurality of users detection receiver had been highly regarded, which is consisted of a set of match filters and a plurality of users detector. The most typical is decorrelation a plurality of users detector, which has linear complication and best far and near effect suppress capability. The disadvantage is that it needs pseudo code, timing and phase information of all interference users.

The suppress to all kinds of interference by above methods can each be used separately. But in fact, two case often appear: which interference condition is not known and the interference parameter is not known; many kinds of interference are present at the same time. At this point, the receiver which can suppress a certain interference cannot work normally when encountering the channel conditions where another interference or many kinds of interference are present at the same time. There is another method which combines the narrowband interference trapper, the Rake receiver and the decorrelation a plurality of users detector. The disadvantage is that the receiver is very complex even that it can not be realized.

Smart antenna used presently could update the weight value in terms of a certain rule, according to the change of the signal space distribution characteristic. The extent and phase of the weight value could be updated freely. When the update algorithm constricts, this method could maximize the signal interference-noise ratio by using the space characteristic of the expected user signal and the interference signal fully. As Chinese patent No. 03115415, which name is "a beam forming method applied for using in wideband CDMA system" put forward this kind of scheme, the steps of the method comprising: perform airspace process for array signals, including, weight value estimate, beam forming, match filtering in the time domain, including de-interference and de-diffusion and channel estimate, compensation; the invention could perform re-diffusion adding interference iterating, forming reference signal, so that the system structure is simplified and technical difficulty and operand are greatly reduced. But the method cannot achieve optimal in any communication condition.

Chinese patent No. 03114286 which name is "a software defined radio frequency transceiver" published a system structure of new wireless mobile communication system, i.e. Software Defined Radio (SDR) technique and supporting SDR technique have design methods of many functional radio frequency transceivers in the base station of the wireless mobile communication system. The multifunctional radio frequency transceiver is consisted of element parts of several programmable, configurable wideband wireless radio frequency receivers, several wideband wireless radio frequency transmitters, local oscillator signal generator and several intermediate frequency digital signal processors. In the control of the software programming, by loading software of different wireless communication standards to the radio frequency transceiver, the different radio frequency signal, the intermediate frequency signal and the clock signal are generated, the different work frequency range, carrier frequency bandwidth and duplex mode are set, so that the corresponding carrier frequency is processed and the corresponding, different signal processing algorithm are ran. Although the patent incorporated the SDR into the smart antenna technique, it is not illuminated that how to perform the application of different algorithm according to the communication condition.

Although the best system performance could be achieved by using the wireless communication system of adaptive antenna array, but presently in practice, the application still have to solve some critical technique problems. Among other things, the calculating complication and robustness of the adaptive beam forming algorithm is one of the problems which limit the development of the adaptive antennas. Many adaptive beam forming algorithm appeared presently have personal characteristic and applying condition. The algorithm performance is highly affected by the application condition. It is very hard to find an adaptive beam forming algorithm which could have good antiinterference performance while could converge rapidly in any conditions and the calculating complexity is low.

Therefore, the influence to signals by the wireless channel is mainly manifested by that the span interference could be generated by the interference signal, the multipath signal and the multipath signal of larger delay.

SUMMARY OF THE INVENTION

The object of the present invention is to provide a method of realizing smart antenna based on software radio and a system of realizing smart antenna based on software radio. The present invention solves the problems that it is difficult to reply various complex communication condition by adapting single adaptive beam forming method in order to make it have more extensive applicability, easy to implement and restrain the effect of the interference effectively.

In order to achieve the above object, the invention provides a method of realizing smart antenna based on software radio in the IMT-2000 CDMA system, wherein respectively selecting corresponding adaptive beam forming algorithms to calculate weights according to the features of wireless communication channel conditions and transmitting the formed beam output according to the weights The above method of realizing smart antenna based on software radio, wherein, particularly comprises the steps of:

Step 1, a condition classifying and recognizing module classifying and recognizing wireless communication channels according to the features of wireless channel conditions;

Step 2, a receiving adaptive beam algorithm select-calculating module selecting a receiving adaptive beam algorithm according the output result of the condition classifying and recognizing module, and calculating receiving weights according to the output of a receiving beam forming module and outputting the receiving weights to the receiving beam forming module;

Step 3, the receiving beam forming module combining a plurality of single channel signals according to the receiving weights and base band signals to form receiving beam output;

Step 4, an transmitting adaptive beam algorithm select-calculating module respectively selecting the corresponding transmitting adaptive algorithms according the output result of the condition classifying and recognizing module and calculating transmitting weights according to the output result of the receiving beam forming module and outputting the transmitting weights to a transmitting beam forming module.

Step 5: the transmitting beam forming module forming transmitting beam output according to the transmitting weights and array data of the transmitting channels.

The above method of realizing smart antenna based on software radio, wherein, the step 1 comprises the steps of:

Step 10, converting array structure into the equivalent uniform line array:

Step 11, dividing the uniform line array having a plurality of array elements into a plurality of couples of sub-arrays, with each couple of sub-arrays comprising a plurality of array elements;

Step 12, calculating the smoothing differential matrix of each sub-space;

Step 13, calculating ranks of each smoothing differential matrix and calculating the number of independent signal source and the number of corresponding groups according to the order of said ranks;

Step 14, classifying the channels according to the number of independent signal source and the number of corresponding groups.

The above method of realizing smart antenna based on software radio, wherein, when the uniform line array of which space between the array elements is the halfwavelength comprises N array elements, the step 11 dividing the uniform line array into K couples of sub-arrays, with each couple sub-arrays comprising m array elements, wherein the receiving signal of the kth forward sub-array is $X_k^f = [x_k, x_{k+1}, \ldots, x_{k+m-1}]^T$, the receiving signal of the kth backward sub-array is $X_k^b = [x_{N-k+1}{}^*, x_{N-k}{}^*, \ldots, x_{K-k+1}{}^*]^T$, where $(\cdot)^T$ is the transposition operator, $(\cdot)^*$ is the conjugation operator, $(\cdot)^H$ is the conjugation transposition operator;

the step 12 calculating the corresponding smoothing differential matrix $R_k^d = R_k^f - R_k^b$ of each space, wherein $R_k^f = E[X_k^f \cdot (X_k^f)^T]$ is the corresponding matrix of the kth forward sub-array, $R_k^b = E[X_k^b \cdot (X_k^b)^T]$ is the corresponding matrix of the kth backward sub-array, wherein $E(\cdot)$ is the mathematical expectation operator.

the step 13 calculating the rank $\text{rank}(R_k^d)$, $k=1, 2, \ldots, K$ of the kth space smoothing differential matrix, and calculating the number of independent signal source and the number of corresponding groups according to the order of this rank;

the step 14 classifying the channels according to the number of independent signal source and the number of corresponding groups.

The above method of realizing smart antenna based on software radio, wherein, the step 14 comprises the steps of:

Step 141, classifying the wireless communication channels of which the number of corresponding groups is 0 and the number of independent signal source is 1 as the first type channel;

Step 142, classifying the wireless communication channels of which the number of corresponding groups number is 0 and the number of independent signal source is more than 1 as the second type channel;

Step 143, classifying the wireless communication channels of which the number of corresponding groups number is more than 0 and the number of independent signal source is 1 as the third type channel;

Step 144, classifying the wireless communication channels of which the number of corresponding groups number is more than 0 and the number of independent signal source is more than 1 as the fourth type channel.

The above method of realizing smart antenna based on software radio, wherein in the step 2, the receiving adaptive beam algorithm select-calculating module respectively selecting Maximum Ratio Combination, Advanced Constant Modulus Algorithm, Wiener solution and pilot frequency bit assistant LMS_DRMTA to calculate the corresponding receiving weights of the first type channel, the second type channel, the third type channel and the fourth type channel; in the step 4, the transmitting adaptive beam algorithm select-calculating module respectively selecting Transmitting Diversity, Advanced Constant Modulus Algorithm to calculate the corresponding transmitting weights of the first type channel, the second type channel, the third type channel and the fourth type channel based on the beam forming eigenvalues and beam arriving, direction estimating algorithm.

To achieve the above objects better, the invention provides a system of realizing smart antenna based on software radio in IMT-2000 CDMA system, comprises:

array antennas comprising a plurality of antenna array elements and arranged as uniform line array;

a radio frequency channel of which the input end correspondingly connected with the output ends of the array antennas;

a receiving beam forming module for combining a plurality of single channel signals according to the receiving weights and the base band signal of the radio frequency channel to form receiving beam output;

a transmitting beam forming module for forming transmitting beam output according to the transmitting weights and array data of the transmitting channels;

the method characterized in that, further comprises:

all condition classifying and recognizing module for recognizing and classifying the features of wireless channel conditions according to the outputs of forward output vectors and backward output vectors of the antenna arrays;

a receiving adaptive beam algorithm select-calculating module for selecting a receiving adaptive algorithm according the output result of the condition classifying and recognizing module, and calculating receiving weights according to the output of the receiving beam forming module;

a transmitting adaptive beam algorithm select-calculating module for respectively selecting the corresponding transmitting adaptive algorithms according the output result of the condition classifying and recognizing module, and calculating the transmitting weights according to the output result of the receiving beam forming module.

The above system of realizing smart antenna based on software radio, wherein, the condition classifying and recognizing module comprises:

an array element dividing unit for dividing the uniform line arrays having a plurality of array elements into a plurality of couples of sub-arrays, with each couple of sub-arrays comprising a plurality of array elements;

a first calculating unit for calculating the smoothing differential matrix of each space, a second calculating unit for calculating rank of the smoothing differential matrix, and calculating the number of independent signal source and the number of corresponding groups according to the order of said ranks;

a classifying recognizing unit for classifying the wireless communication channels according to the number of independent signal source and the number of corresponding groups.

In the above system of realizing smart antenna based on software radio, wherein the classifying recognizing unit is used for classifying the wireless communication channels of which the number of corresponding groups is 0 and the number of independent signal source is 1 as the first type channel, classifying the wireless communication channels of which the number of corresponding groups number is 0 and the number of independent signal source is more than 1 as the second type channel, classifying the wireless communication channels of which the number of corresponding groups number is more than 0 and the number of independent signal source is 1 as the third type channel, and classifying the wireless communication channels of which the number of corresponding groups number is more than 0 and the number of independent signal source is more than 1 as the fourth type channel.

In the above system of realizing smart antenna based on software radio, wherein the receiving adaptive beam algorithm select-calculating module respectively selecting Maximum Ratio Combination, Advanced Constant Modulus Algorithm, Wiener solution and pilot frequency bit assistant LMS_DRMTA to calculate the corresponding receiving weights of the first type channel, the second type channel, the third type channel and the fourth type channel; the transmitting adaptive beam algorithm select-calculating module respectively selecting Transmitting Diversity, Advanced Constant Modulus Algorithm to calculate the corresponding transmitting weights of the first type channel, the second type channel, the third type channel and the fourth type channel based on the beam forming eigenvalues and beam arriving direction estimating algorithm.

As adopting the method of realizing smart antenna based on software radio, the invention has many advantages compared with existing adaptive beam forming method: selecting corresponding more proper beam forming algorithm by analyzing the characteristic of communication channels, so that the smart antenna base station have widely adaptability; adopting the adaptive algorithm selecting method of the software radio technique, avoiding the limitation of the a single certain adaptive beam forming method, the method easy to switch, the calculate being fast, reducing the difficulty of the hardware implementation, easy to engineering realizing; adopting the software radio technique-based beam forming method, easy to upgrade and maintain the base station system; the algorithm could track the direction of arrival of the users, self-adaptively adjusting the weight vectors, could form the beam maximum point in the direction of arrival of desired users while forming zero defect in the interference direction, restraining the effect of the interference effectively. In any case, adopting the system of realizing smart antenna based on software radio realized by the method provided by the invention, in case that the hardware cost is low, the performance-cost ratio of the smart antenna base station system is improved highly, the engineering is easy to realize while the processing performance of the base station is improved highly. The large hardware cost is not needed compared to the common smart antennas, the performance-cost ratio of the system of realizing smart antenna based on software radio is improved highly.

The invention will be illuminated in detail with reference to the accompanying drawings and preferred embodiments.

EMBODIMENTS OF THE INVENTION

The invention adopts the spacial smoothing differential processing method which performs dimension reduction and decorrelation for the array receiving signal covariance matrix successively, getting the correlative structure of the receiving signal by converting the correlative signal into single signal source successively, realizing the condition identification. The communication condition of the embodiments of the invention could have following four types:

Channel type 1: Gaussian White Noise plus single desired signal;

Channel type 2: desired signal plus interference signal, without regard to the multipath effect;

Channel type 3: desired signal plus interference signal, and exists the multipath signal generating smaller delay extend by the multipath effect;

Channel type 4: desired signal plus interference signal, and exists the multipath signal generating larger delay extend by the multipath effect, also could exist the multipath signal generating smaller delay extend.

In the signal diffusion condition recognizing, the antenna array gets the space information, extracting proper characteristic quantity to identify different conditions. For the IMT-2000 CDMA system, as the orthogonal PN code is used, the interference signal and the desired signal appear as hardly correlation. But for the signal generated by multipath, when the relative delay extend is smaller, it is considered that there is correlation between each multipath signals. When the diffusion delay is more than one code piece period, the multipath signal could be considered as mutual independence. So the interference signal and the desired signal could be considered as independence groups with each multipath signals. But the multipath signal whose relative delay extend is larger could be the separated as independence groups with the desired signal. Therefore, the correlative structure could be getting correlative source, i.e. estimating source number, wherein the characteristic of the groups number of the correlative source, correlative source number in the correlative source groups and so on could be used to identify different channel types.

On the base of the channel conditions classifying, different uplink and downlink beam forming methods could be adopted aimed at different types of channel, so that finishing the uplink/downlink adaptive beam forming process in different conditions, measures overcoming the channel time varying characteristic, satisfying the communication demand of different conditions, improving the communication quality.

Figure 1:
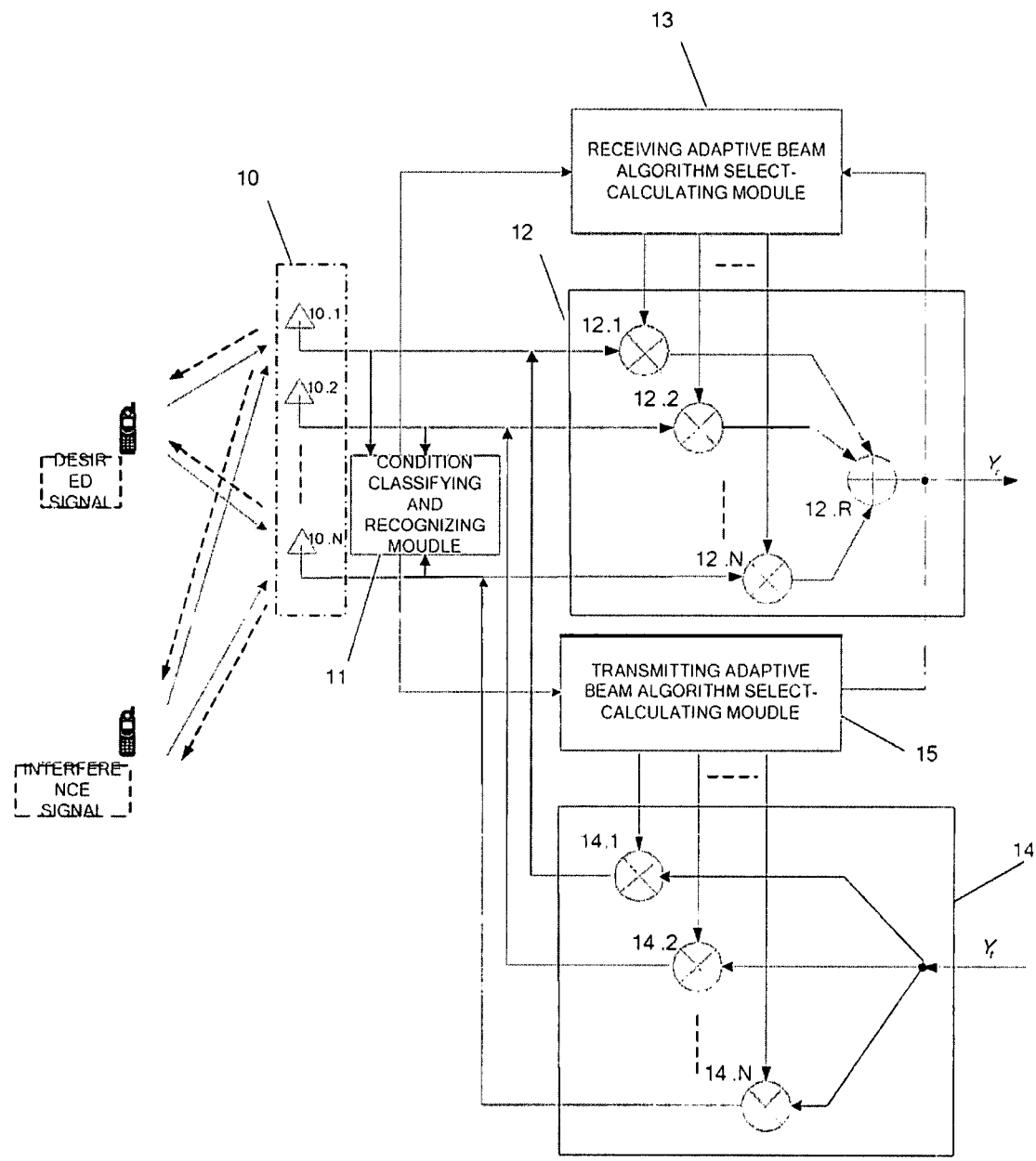
FIG. 1 is the structural diagram schematically illustrating the system of realizing smart antenna based on software radio.

FIG. 1 is the structural representation of the system of realizing smart antenna based on software radio of the invention.

The system of realizing smart antenna based on software radio used in the software radio-based IMT-2000 CDMA system of the invention comprises six parts: an array antenna 10, a condition classifying and recognizing module 11, a radio frequency channel, a receiving beam forming module 12, a transmitting beam forming module 14, a receiving adaptive beam algorithm select-calculating module 13 and a transmitting adaptive beam algorithm select-calculating module 15.

As the scrambling generation, the module functions of spread spectrum code generation, code synchronization, descrambling and de-spreading, clock control and so on in the system of realizing smart antenna based on software radio are not the problems regarded by the invention, these modules are not described in the invention commonly. These modules or the output signals thereof are quoted directly if needs.

The antenna array 10 includes a plurality of antenna array elements 10.1, 10.2 ... 10.N, whose outputing end connected to the inputting end of the radio frequency channel. The radiation direction of the antenna array elements could be arbitrary. The arrangement of the antenna array 10 is the uniform line array. For other nonuniform line array structure, it needs to perform corresponding process to convert to equivalent line array and perform process then;

The radio frequency channel finishes functions of the low noise magnification, automatic gain control, channel correction, base band conversion, A/D and D/A conversion matching filtering and so on. The radio frequency channel numbers are corresponding to the antenna array elements 10.1, 10.2 ... 10.N one to one. The inputting end of each radio frequency channel is connected to the outputing end of a antenna array element. The outputing end of all the radio frequency channels are connected the inputting end of the receiving beam forming module 12 and the inputting end of the condition classifying and recognizing module 11 respectively;

The receiving/transmitting adaptive beam algorithm select-calculating module 13/15 finishes weights update algorithm, resulting a new group weights, and outputs the weights to the beam forming module 12/14, The inputting signals of the receiving adaptive beam algorithm select-calculating module 13 have: the output signal of the receiving beam forming module 12, the output signal of the condition classifying and recognizing module 11.

The inputting signals of the transmitting adaptive beam algorithm select-calculating module 15 have: the output signal of the receiving beam forming module 12, the Output signal of the condition classifying and recognizing module 11

The condition classifying and recognizing module 11 performs estimating recognizing and classifying for the wireless communication channel conditions characteristic according to the forward output vector and the backward output vector of the antenna array 10;

The receiving beam forming module 12 performs the function of complex number weighing summation to the signal via the radio frequency channel using the weight value, whose inputting end further comprises the weight value from the receiving adaptive beam algorithm select-calculating module 13 besides the digital signal via the radio frequency channel, the outputing end of the receiving beam forming module 12 connected to the inputting end of the multi-user detection;

The inputting end of the transmitting beam forming module 14 further comprises the weight value from the transmitting adaptive beam algorithm select-calculating module 13 besides the array data signal via the transmitting channel, the outputing end of the transmitting beam forming module connected to the radio frequency channel;

The above structure modules could be software modules, some modules could be realized by software in DSP; also could be hardware module, these modules could be made in Application Specific Integrated Circuit Chip (ASIC) or FPGA.

The wireless signal enters the system by the antenna array 10, while the antenna array 10 is consisted of N array elements 10.1, 10.2, ..., 10N. The signal received by the antenna array elements could be processed by N radio frequency channels, generating N base band signals. The signal have been discretized in the radio frequency channels outputing as $X_r=[x_{r1}, x_{r2}, \ldots, x_{rN}]$, the following, processes are the digital signal processes. The output of the antenna array 10 enters corresponding receiving beam forming module 12 and condition classifying and recognizing module 11 via the radio frequency channel. The condition classifying and recognizing module 11 performs estimating according to received array data and inputs the result to the receiving adaptive beam algorithm select-calculating module 13 and the transmitting adaptive beam algorithm select-calculating module 15, the receiving adaptive beam algorithm select-calculating module 13 selects proper receiving beam forming, algorithm according to the outputing result of the condition classifying and recognizing module 11 and performs process according to the receiving beam forming module 12, the receiving adaptive beam algorithm select-calculating module 13 calculates a new weight value Wr, sends it to the receiving beam forming module 12, the new received weight value $W_r=[w_{r1}, w_{r2}, \ldots, w_{rN}]$ consisted of N components. The receiving beam forming module 12 is consisted of N multipliers 12.1, 12.2, ..., 12.N and an adder 12.R. The receiving beam forming is performed according to the array data from the radio frequency channel and the new received weights output by the receiving adaptive beam algorithm select-calculating module 13. The base band receiving, signal X, and the receiving weight value $W_r$ are multiplied and added, generating the output signal $Y_r=[y_{r1}, y_{r2}, \ldots, y_{rN}]$.

The transmitting adaptive beam algorithm select-calculating module 15 selects proper transmitting beam forming algorithm according to the outputing result of the condition classifying and recognizing module 11 and performs process according to the outputing signal of the receiving beam forming module 12 and the data $Y_1=[y_{r1}, y_{r2}, \ldots, y_{rN}]$ from the sending array, the transmitting adaptive beam algorithm select-calculating module 15 calculates a new weight value $W_r$, sends it to the transmitting beam forming module 14, the new transmitted weight value $W_r=[w_{r1}, w_{r2}, \ldots, w_{rN}]$ consisted of N components. The transmitting beam forming module 14 is consisted of N multipliers 14.1, 14.2, ..., 14.N. The transmitting beam is formed according to the array data $Y_1=$

[$y_{r1}, y_{r2}, \ldots, y_{rN}$] from the transmitting channel and the transmitted weights $W_r=[w_{r1}, w_{r2}, \ldots, w_{rN}]$ output by the transmitting adaptive beam algorithm select-calculating module 15 and output by the radio frequency channel.

Figure 2:
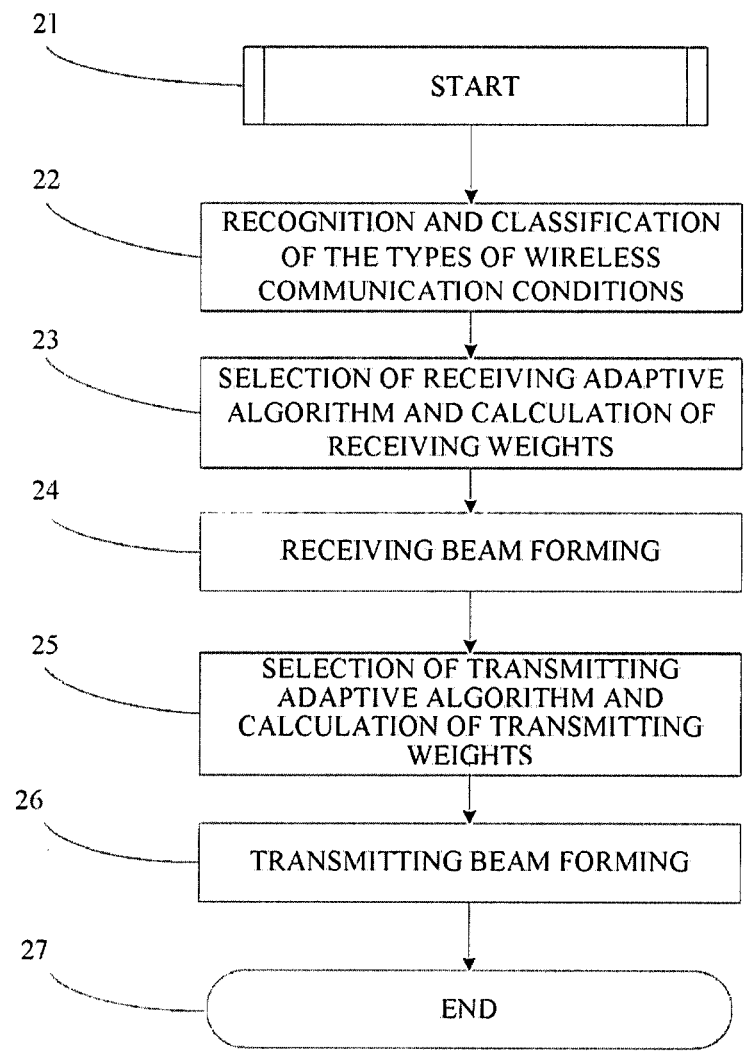
FIG. 2 is the flowchart diagram schematically illustrating the method of realizing smart antenna based on software radio.

FIG. 2 is the method flowchart of the invention. In the adaptive manner smart antenna, the weights of the corresponding space domain or space, time domain could be adjusted according to a certain adaptive algorithm arbitrarily, to match the current transfer condition as much as possible. The corresponding smart antenna receiving/transmitting beam could be any pointed. In the practice communication, the channel situation is very complex. Presently, adopting single one adaptive beam forming method could make well performance in any condition. It is hard to implement. Therefore, the relative more proper beam forming algorithm could be chosen by analyzing the communication channel characteristic, so that the smart antenna base station could have more widely adaptability. The method set forth in the invention could be realized in following steps:

Step 21, start:

Step 22, the condition classifying and recognizing module 11 performs the recognizing and classifying for the wireless communication channel types:

Step 23, the receiving adaptive beam algorithm select-calculating module performs the select of the receiving adaptive algorithm and the calculate of the receiving weights according to the results of above identification and classifying selects the forming methods of Maximum Ratio Combination, Advanced Constant Modulus Algorithm (CAM), Wiener solution and pilot frequency bit assistant LMS_DRMTA (Least-Mean-Squares De-spread Re-spread Multi-Target Array) and so on to calculate receiving weights for the channel type 1, the channel type 2, the channel type 3 and the channel type 4 respectively;

Step 24, the receiving beam forms, the receiving beam forming module combines a plurality of single channel communication numbers and forms beam $Y_r=W_r^H \cdot X_r$;

Step 25, the transmitting adaptive beam algorithm select-calculating module performs the select of the transmitting adaptive algorithm and the calculate of the transmitting weights according to the results of above identification and classifying, selects the adaptive beam forming methods of Transmit Diversity (TD). Advanced Constant Modulus Algorithm, Eigenvalue Based Beamforming, (EBB) and Direction of Arrival (DOA) estimating and so on to calculate transmitting weights for the channel type 1, the channel type 2, the channel type 3 and the channel type 4 respectively;

Step 26, the transmitting beam forms, the transmitting beam forming module forms transmitting beam output according the transmitting weights and the array data of the transmitting channel;

Step 27, end.

The uplink/downlink adaptive beam forming in different conditions could be finished by the above flow. Here, a receiving/trasmitting, adaptive algorithm library could be constructed. The algorithm is not limited to the above listed algorithms.

Figure 3:
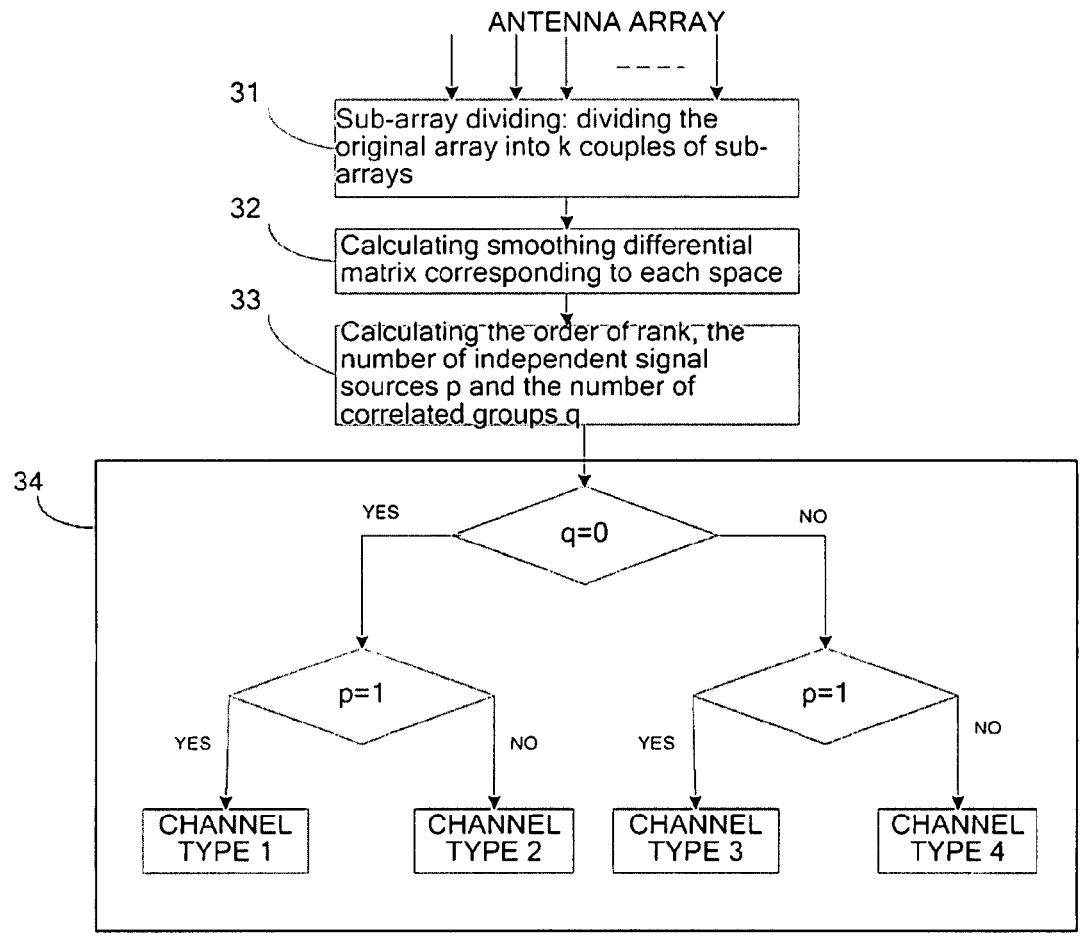
FIG. 3 is the flowchart schematically illustrating the wireless communication condition recognizing and classifying in the invention.

FIG. 3 is the flowchart of the wireless communication condition detection and channel identification, comprising the steps of:

Step 31, sub-array dividing, dividing the uniform line array (the space between the array elements is half the wavelength) having N array elements into K couples of sub-array, each couple of sub-array consisted of m array elements. The receiving signal $X_k^f$ of kth forward sub-array appeal as $X_k^f = [x_k, x_{k+1}, \ldots, x_{k+m-1}]^T$, the receiving signal $X_k^b$ of kth backward sub-array appear as $X_k^b=[x_{N-k+1}^*, x_{N-k}^*, \ldots, x_{K-k+1}^*]^T$, where $(\cdot)^T$ is the transposition operator, $(\cdot)^*$ is the conjugation operator, $(\cdot)^H$ is the conjugation transposition operator;

Step 32, calculating the corresponding smoothing differential matrix of each space, $R_k^f=E[X_k^f \cdot (X_k^f)^T]$ is set as the corresponding matrix of kth forward sub-array, $R_k^b=E[X_k^b \cdot (X_k^b)^T]$ is set as the corresponding matrix of kth backward sub-array, generating the kth space smoothing differential matrix $R_k^d=R_k^f-R_k^b$. Wherein $E(\cdot)$ is the mathematical expectation operator;

Step 33, calculating the rank, generating the rank rank ($R_k^d$), k=1, 2, ..., K of kth space smoothing differential matrix, and calculating the independent source number p and the corresponding groups number q according to the rank order, wherein rank(.) denotes calculating the rank of the matrix, reference to the document "COZZENS J H, SOUDA M J. Source enumeration in a correlated singed condition [J]. IEEE Trans SP, 1994, 42 (2)" for the detail judging method;

Step 34, classifying the channel according to the independent source number and corresponding groups number:

Channel type 1: the corresponding groups number q=0 and the independent source number p=1, there are desired signal and additional Gaussian White Noise in the channel mow, the delay extend is small;

Channel type 2: the corresponding groups number q=0 and the independent source number p>1, there are both desired signal and interference signal in the channel mow, the delay extend is not large, there is extend of a certain angle, mainly appearing as same channel interfere;

Channel type 3: the corresponding groups number q=0 and the independent source number p−1, the delay extend of the desired signal is larger the angle of the extend is smaller, mainly appearing as inter-codes interfere;

Channel type 4: the corresponding groups number q>0 and the independent source number p>1, there are some delay extend and angle extend in desired signal and interference signal.

Figure 4:
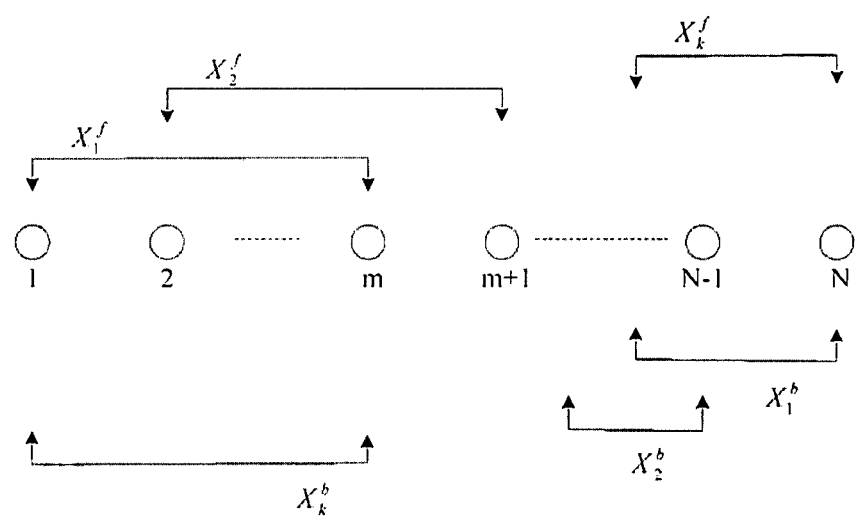
FIG. 4 is the diagram schematically illustrating sub-array dividing of the present invention.
Figure 5A:
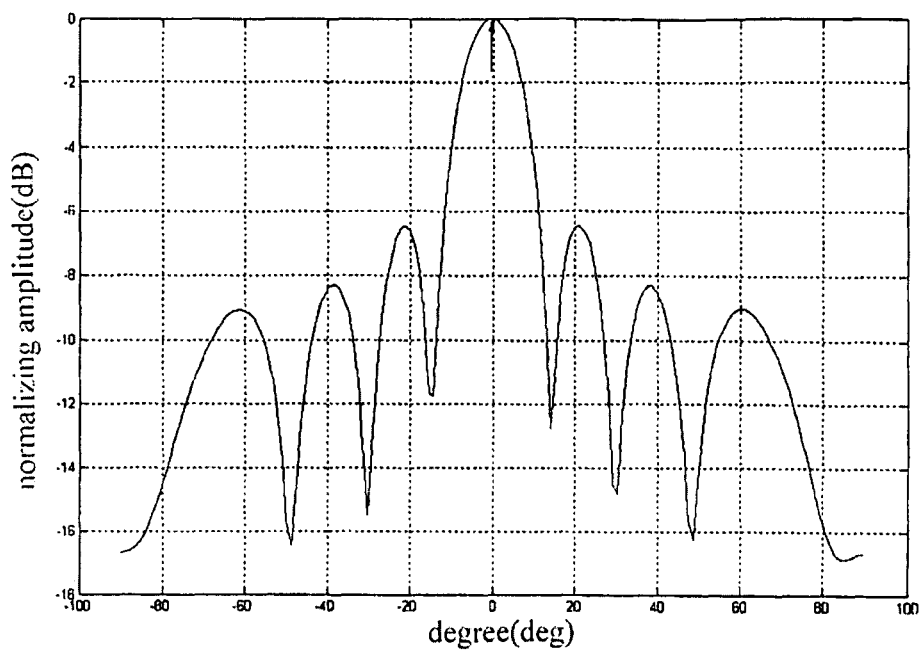
FIG. 5($a$) through 5($d$) are diagrams schematically illustrating the wireless communication channel classifying.
Figure 5B:
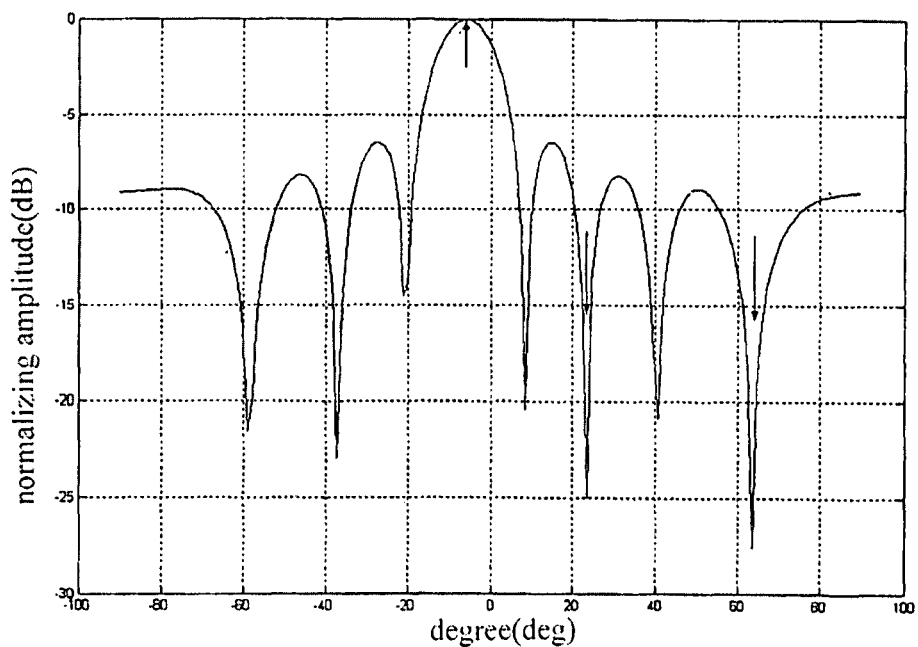
Figure 5C:
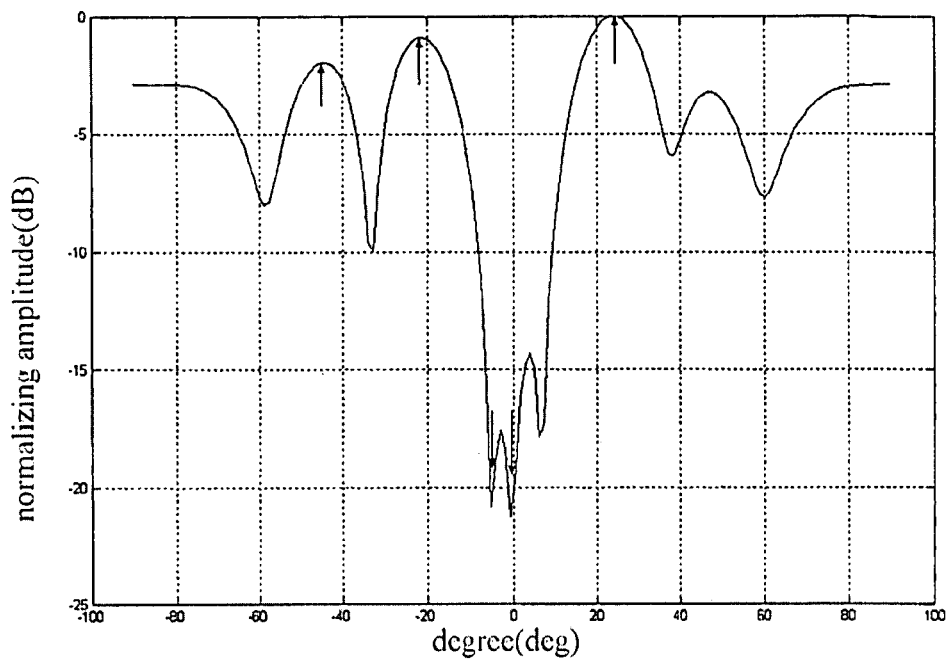
Figure 5D:
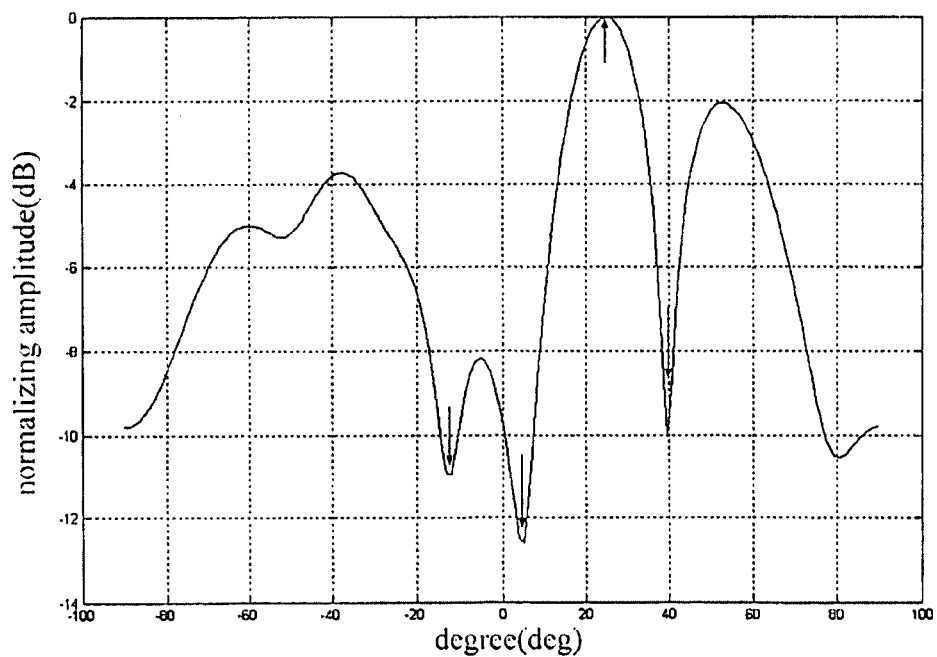

FIG. 4 is the sub-array dividing representation of in the invention. The uniform line array (array elements is N) is divided into K couples of sub-array, each couple of sub-array including: a forward sub-array of m array elements, each sub-array moving to the right from the left; a backward sub-array of m array elements, each sub-array moving to the left from the right. The output vector of the forward sub-array is:

$$X_1^f=[x_1,x_2,\ldots,x_m]^T$$

$$X_2^f=[x_2,x_3,\ldots,x_{m+1}]^T$$

$$\ldots$$

$$X_K^f=[x_K,x_{K+1},\ldots,x_{K+m-1}]^T$$

The output vector of the backward sub-array is:

$$X_1^b=[x_N^*,x_{N-1}^*,\ldots,x_K^*]^T$$

$$X_2^b=[x_{N-1}^*,x_{N-2}^*,\ldots,x_{K-1}^*]^T$$

$$\ldots$$

$$X_K^b=[x_{N-K+1}^*,x_{N-K}^*,\ldots,x_1^*]^T$$

It is necessary to illuminate that the space smoothing difference method only applied to the uniform line array and cannot be applied to other array structures directly; meanwhile, the uniform line array elements number N, space source number L and sub-array number K should satisfy: N≧L+K/2. For other array structures of round array and so on, the methods of interpolation and so on could be used to convert other array structures of round array and so on into equivalent line array and use the above method then.

FIG. 5 is the representation of the wireless communication condition classifying. Channel type 1: having an independent source and additional Gaussian White Noise, the main beam pointed to the desired signal direction directly, without regard to the zero suppression of the interference. The beam direction is shown in FIG. 5(a). Channel type 2: having an interfere source except the independent sources, the interfere source number could be a plurality of but without regard to the multipath effect, now appearing as having a plurality of independent sources. Here, the beam should point to the desired signal and the zero suppression should performed to the interference signals, as shown in FIG. 5(b). Channel type 3: regard to the multipath effect, but considering that the delay difference of each multipath signals of desired signals, each multipath signals are correlative, constructing a group independent of the interference signals. But the interference signals could be consisted by a plurality of independent interfere sources and could be consisted by the multipath signals of the interfere sources. Here, it can be formed that a plurality of beams pointed to each multipath signal of the desired signals, utilize multipath signals fully while perform the zero suppression for the interference signals, as shown in FIG. 5(c). Channel type 4: in complex communication condition, in base that considering multipath effects, it is considered that the multipath delay difference of the desired signals is larger, appearing irrelevance, easy to generate inter-paths interference like inter-codes interference. Here, the beam could point to the multipath signal whose relative delay is smaller in the desired signal, the multipath signal whose relative delay is larger could be considered as independent source incorrelated to the desired signals and performs the zero suppression in this direction, as shown in 5(d).

Indeed, the present invention could have other many kinds of embodiments, anyone of ordinary skill in the art could make any corresponding changes and modifications according to the invention without departing from the spirit and the matter of the invention, but all these corresponding changes and modifications should fall within the protection scope of the claim of the invention.

As the invention adopts the method of realizing smart antenna based on software radio, it has many advantages compared with existing adaptive beam forming method: selecting corresponding more proper beam forming algorithm by analyzing the characteristic of communication channels, so that the smart antenna base station have widely adaptability; adopting the adaptive algorithm selecting method of the software radio technique, avoiding the limitation of the a single certain adaptive beam forming method, the method easy to switch, the calculate being fast, reducing the difficulty of the hardware implementation, easy to engineering realizing; adopting the software radio technique-based beam forming method, easy to upgrade and maintain the base station system; the algorithm could track the direction of arrival of the users, self-adaptively adjusting the weight vectors, could form the beam maximum point in the direction of arrival of desired users while forming zero defect in the interference direction, restraining the effect of the interference effectively. In any case, adopting the system of realizing smart antenna based on software radio realized by the method provided by the invention, in condition that the hardware cost is low, the performance-cost ratio of the smart antenna base station system is improved highly, the engineering is easy to realize while the processing performance of the base station is improved highly. The large hardware cost is not needed compared to the common smart antennas, the performance-cost ratio of the system of realizing smart antenna based on software radio is improved highly.

What is claimed is:

1. A method of realizing smart antenna based on software radio in IMT-2000 CDMA system, characterized in that respectively selecting corresponding adaptive beam forming algorithms to calculate weights according to the features of wireless communication channel conditions and transmitting the formed beam output according to the weights;

wherein the method comprising the steps of:

Step 1, a condition classifying and recognizing module classifying, and recognizing wireless communication channels according to the features of wireless channel conditions;

Step 2, a receiving adaptive beam algorithm select-calculating module selecting receiving adaptive beam algorithms according to the output results of the condition classifying and recognizing module, and calculating receiving weights according to the output of a receiving beam forming module and outputting the receiving weights to the receiving beam forming module;

Step 3, the receiving beam forming module combining a plurality of single channel signals according to the receiving weights and base band signals to form receiving beam output;

Step 4, a transmitting adaptive beam algorithm select-calculating module respectively selecting corresponding transmitting adaptive algorithms according the output results of the condition classifying and recognizing module, and calculating transmitting weights according to the output of the receiving beam forming module and outputting the transmitting weights to a transmitting beam forming module;

Step 5: the transmitting beam forming module forming transmitting beam output according to the transmitting weights and array data of the transmitting channels;

wherein the step 1 comprising the steps of:

Step 10, convening array structure into the equivalentuniform line array;

Step 11, dividing the uniform line array having a plurality of array elements into a plurality of couples of sub-arrays, with each couple of sub-arrays comprising a plurality of array elements;

Step 12, calculating the smoothing differential matrix of each sub-space;

Step 13, calculating ranks of each smoothing differential matrix, and calculating the number of independent signal source and the number of corresponding groups according to the order of said ranks;

Step 14, classifying the channels according to the number of independent signal source and the number of corresponding groups;

wherein the step 14 comprising the steps of:

Step 141, classifying the wireless communication channels of which the number of corresponding groups is 0 and the number of independent signal source is 1 as the first type channel;

Step 142, classifying the wireless communication channels of which the number of corresponding groups number is 0 and the number of independent signal source is more than 1 as the second type channel;

Step 143, classifying the wireless communication channels of which the number of corresponding groups numbers is 0 and the number of independent signal source is more than 1 as the third type channel;

Step 144, classifying the wireless communication channels of which the number of corresponding groups number is more than 0 and the number of independent signal source is more than 1 as the fourth type channel.

2. The method of realizing smart antenna based on software radio according to claim 1, characterized in that when the uniform line array of which space between the array elements is the halfwavelength comprising N array elements, the step 11 dividing the uniform line array into K couples of sub-arrays, with each couple sub-arrays comprising m array elements, wherein the receiving signal of the kth-forward sub-array is $X_k^f=[x_k, x_{k+1}, \ldots, x_{k+m-1}]^T$, the receiving signal of the kth backward sub-array is $X_k^b=[x_{N-k+1}^*, x_{N-k}^*, \ldots, x_{K-k+1}^*]^T$, wherein $(\cdot)^T$ is the transpositionoperator, $(\cdot)^*$ is the conjugationoperator, $(\cdot)^H$ is the conjugationtranspositionoperator;

the step 12 calculating the corresponding smoothing differential matrix $R_k^d=R_k^f-R_k^b$ of each space, wherein $R_k^f=E[X_k^f \cdot (X_k^f)^T]$ is the corresponding matrix of the kthforward sub-array, $R_k^b=E[X_k^b \cdot (X_k^b)^T]$ is the corresponding matrix of the kth backward sub-array, wherein $E(\cdot)$ is the mathematical expectationoperator;

the step 13 calculating the rank $rank(R_k^d)$, $k=1, 2, \ldots, K$ of the kth space smoothing differential matrix, and calculating the number of independent signal source and the number of corresponding groups according, to the order of this rank;

the step 14 classifying the channels according to the number of independent signal source and the number of corresponding groups.

3. The method of realizing smart antenna based on software radio according to claim 1, characterized in that:

in the step 2, the receiving adaptive beam algorithm select-calculating module respectively selecting Maximum Ratio Combination, Advanced Constant Modulus Algorithm, Wienersolution and pilot frequency hit assistant LMS_DRMTA to calculate the corresponding receiving weights of the first type channel, the second type channel, the third type channel and the fourth type channel;

in the step 4, the transmitting adaptive beam algorithm select-calculating module respectively selecting Transmitting Diversity; Advanced Constant Modulus Algorithm to calculate the corresponding transmitting weights of the first type channel, the second type channel, the third type channel and the fourth type channel based on the beam forming eigenvalues and beam arriving direction estimating algorithm.

4. A system of realizing smart antenna based on software radio in IMT-2000 CDMA systems, comprises:

array antennas comprising a plurality of antenna array elements and arranged as uniform line array;

a radio frequency channel of which the input end correspondingly connected with the output ends of the array antennas;

a receiving beam forming module for combining a plurality of single channel signals according to the receiving weights and the base band signal of the radio frequency channel to form receiving beam output;

a transmitting beam forming module for forming transmitting beam output according to the transmitting weights and array data of the transmitting channels;

the system characterized in that, further comprises:

an condition classifying and recognizing module for recognizing and classifying the features of wireless channel conditions according to the outputs of forward output vectors and backward output vectors of the antenna arrays;

a receiving adaptive beam algorithm select-calculating module for selecting receiving adaptive algorithms according the output results of the condition classifying and recognizing module, and calculating receiving weights according to the output of the receiving beam forming module;

a transmitting adaptive beam algorithm select-calculating module for respectively selecting corresponding transmitting adaptive algorithms according the output results of the condition classifying and recognizing module, and calculating the transmitting weights according to the output of the receiving beam forming module;

wherein the condition classifying and recognizing module comprising:

an array element dividing unit for dividing the uniform line arrays having a plurality of array elements into a plurality of couples of sub-arrays, with each couple of sub-arrays comprising a plurality of array elements;

a first calculating unit for calculating the smoothing differential matrix of each space;

a second calculating unit for calculating ranks of the smoothing differential matrix, and calculating the number of independent signal sources and the number of corresponding groups according to the sequence of said ranks;

a classifying recognizing unit for classifying the wireless communication channels according to the number of independent signal sources and the number of corresponding groups;

wherein the classifying recognizing unit is used for classifying the wireless communication channels of which the number of corresponding groups is 0 and the number of independent signal source is 1 as the first type channel, classifying the wireless communication channels of which the number of corresponding groups number is 0 and the number of independent signal source is more than 1 as the second type channel, classifying the wireless communication channels of which the number of corresponding groups number is more than 0 and the number of independent signal source is 1 as the third type channel, and classifying the wireless communication channels of which the number of corresponding groups number is more than 0 and the number of independent signal source is more than 1 as the fourth type channel.

5. The system of realizing smart antenna based on software radio according to claim 4, characterized in that, the receiving adaptive beam algorithm select-calculating module respectively selecting Maximum Ratio Combination, Advanced Constant Modulus Algorithm, Wienersolution and pilot frequency bit assistant LMS_DRMTA to calculate the corresponding receiving weights of the first type channel, the second type channel, the third type channel and the fourth type channel;

the transmitting adaptive beam algorithm select-calculating module respectively selecting Transmitting Diversity, Advanced Constant Modulus Algorithm to calculate the corresponding transmitting weights of the first type channel, the second type channel, the third type channel and the fourth type channel based on the beam forming eigenvalues and beam arriving direction estimating algorithm.

* * * * *